US008954061B2

(12) United States Patent
Vellanki et al.

(10) Patent No.: US 8,954,061 B2
(45) Date of Patent: Feb. 10, 2015

(54) STORED USER SELECTABLE PREFERENCES FOR SUPPORTING DATA ROAMING IN GPRS NETWORKS

(75) Inventors: Vivekanand Vellanki, Hyderabad (IN); Dalen Matthew Abraham, Duvall, WA (US); Malayala R. Srinivasan, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/973,758

(22) Filed: Oct. 10, 2007

(65) Prior Publication Data

US 2009/0098870 A1 Apr. 16, 2009

(51) Int. Cl.
 H04W 4/00 (2009.01)
 H04W 36/36 (2009.01)
 H04W 48/18 (2009.01)
(52) U.S. Cl.
 CPC .............. *H04W 36/36* (2013.01); *H04W 48/18* (2013.01)
 USPC ....................................... 455/432.1; 455/436
(58) Field of Classification Search
 CPC ........ H04W 36/36; H04W 8/18; H04W 8/187
 USPC .............. 455/432.1, 432.3, 434, 435.1, 435.3
 See application file for complete search history.

(56) References Cited

U.S. PATENT DOCUMENTS

| 5,903,832 | A  | * | 5/1999  | Seppanen et al. .......... 455/435.3 |
| 6,097,950 | A  |   | 8/2000  | Bertacchi |
| 6,345,184 | B1 |   | 2/2002  | van der Salm et al. |
| 6,405,038 | B1 |   | 6/2002  | Barber et al. |
| 6,625,451 | B1 |   | 9/2003  | La Medica, Jr. et al. |
| 6,745,029 | B2 |   | 6/2004  | Lahtinen et al. |
| 6,771,961 | B2 |   | 8/2004  | Bamburak et al. |
| 7,089,001 | B2 |   | 8/2006  | Leung et al. |
| 7,139,570 | B2 |   | 11/2006 | Elkaret et al. |
| 7,149,516 | B2 |   | 12/2006 | Armbruster et al. |
| 7,171,203 | B2 |   | 1/2007  | Buckley |

(Continued)

OTHER PUBLICATIONS

"Bell Mobility and RIM Announce Breakthrough Smartphone for Canadians with the BlackBerry 8830 World Edition," http://www.rim.net/news/press/2007/pr-25_04_2007-03.shtml.

(Continued)

*Primary Examiner* — Vladimir Magloire
(74) *Attorney, Agent, or Firm* — John Jardine; Kate Drakos; Micky Minhas

(57) ABSTRACT

A method and apparatus for supporting data connectivity with a roaming partner when a communication device is outside a service provider's range of coverage is provided. In one aspect, a user can select and store a roaming partner that is capable of data communication. While roaming, the communication device will display the data-roaming partners that are currently available within the communication range of the device and the user can choose one of these data-roaming partners and store the data-roaming partner information in memory. Upon re-entering the region within communication range of that roaming partner, the device can communicate with the roaming partner of choice rather than the roaming partner ordinarily selected by the device as a default.

15 Claims, 4 Drawing Sheets

(56) References Cited

U.S. PATENT DOCUMENTS

| | | | |
|---|---|---|---|
| 7,702,329 B1* | 4/2010 | Durig et al. | 455/432.1 |
| 2004/0224680 A1 | 11/2004 | Jiang | |
| 2004/0253947 A1* | 12/2004 | Phillips et al. | 455/422.1 |
| 2005/0037755 A1* | 2/2005 | Hind et al. | 455/435.3 |
| 2005/0113088 A1* | 5/2005 | Zinn et al. | 455/435.2 |
| 2006/0183477 A1* | 8/2006 | Bocking et al. | 455/435.2 |
| 2006/0276226 A1 | 12/2006 | Jiang | |
| 2007/0259646 A1* | 11/2007 | Hu et al. | 455/406 |
| 2008/0167033 A1* | 7/2008 | Beckers | 455/432.3 |

OTHER PUBLICATIONS

Fouial et al., "Advanced Service Provision Architecture for Mobile Computing Environments," http://www.infres.enst.fr/~demeure/PUBLIS/IST-Summit-2002-Final.pdf.

Steinhage et al., "User-Interface-Technologies and—Techniques," http://www.wireless-world-research.org/fileadmin/sites/default/files/about_the_forum/WG/WG1/White%20Papers/WG1-User-Interface-Technologies-Techniques.pdf.

* cited by examiner

STORED USER SELECTABLE PREFERENCES FOR SUPPORTING DATA ROAMING IN GPRS NETWORKS

BACKGROUND

Wireless communication devices (such as GSM/GPRS devices) connect to networks typically by subscribing to a particular service provider. When the device is in communication range of the service provider's area of coverage, the device will automatically be able to register to the service provider. However, when the device is brought to an area outside of the service provider's area of coverage, the device will automatically switch to a "roaming" mode whereby the device can register with a roaming partner having an agreement with the user's service provider.

While this automatic switching to the pre-set or pre-agreed upon roaming partner provides a practical solution in some situations, such an automatic selection may pose some issues. For example, the user may want to choose a roaming partner that is different from that which the device is registered because the user knows that roaming on a particular partner costs less than the roaming partner automatically selected by the device. Also, the roaming partner to which the device is pre-registered might be a voice-only roaming partner, meaning that the user will be unable to establish a data connection.

One solution to this problem is to display all roaming partners that are available within the range of the device, and let the user choose the roaming partner. This solution may not be helpful because the user may not know how to select an appropriate roaming partner, especially when the user is unable to discern which of the roaming partners offers data connectivity. Further, users who roam between two locations frequently (e.g. US and UK) would have to make this selection every time they roam.

SUMMARY

Applicants have appreciated that allowing the user to select and store a roaming partner that is capable of data communication would be beneficial. In this manner, while roaming, the device will display the data-roaming partners that are currently available within the communication range of the device. The user can choose one of these data-roaming partners and the data-roaming partner information can be stored in memory in the device. The next time the user travels to the region within communication range of that data-roaming partner, the device will display the user's preference rather than the roaming partner ordinarily selected by the device.

In one embodiment, a method of supporting data-roaming on a wireless communication device is provided. The method includes selecting a roaming partner capable of data communication from a plurality of roaming partners; storing the selection in a computer-readable storage medium in the device as a user preference; and automatically or manually selecting the user's preference when the device is within a communication range of the stored roaming partner.

In another embodiment, a wireless communication device capable of electronic wireless data communication via a roaming partner is provided. The device includes a processor and a computer-readable storage medium cooperating with the processor. The storage medium includes a provider identification that identifies a roaming partner capable of data communication. The provider identification has been previously selected and stored in the storage medium by a user as user preferences. A radio cooperates with the processor and allows the processor to communicate with the roaming partner. A user interface cooperates with the storage medium. The user interface is adapted to allow the user to automatically or manually select the previously selected and stored provider identification.

In another embodiment, a method of supporting data-roaming on a wireless communication device is provided. The method includes selecting, when in a country, a roaming partner capable of data communication from a plurality of roaming partners operating within the country and storing the selection in a computer-readable storage medium in the device as a user preference. The method also includes displaying the user's preference to a user when the device returns to the country of the data-roaming partner and automatically or manually selecting the user's preference.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
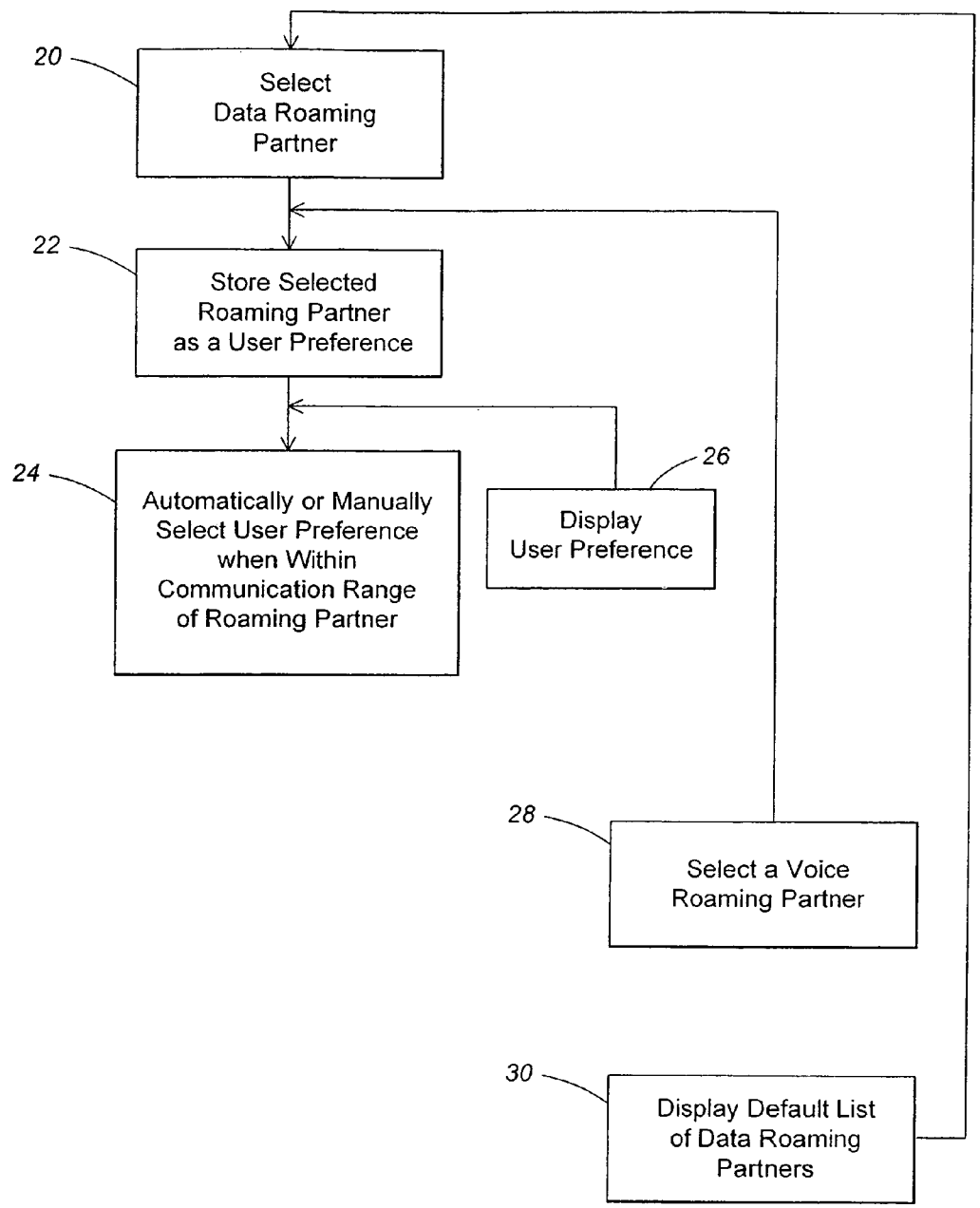
FIG. 1 is a flowchart of an illustrative process of for supporting data-roaming on a wireless communication device according to an aspect of the invention.

The present invention relates to methods and apparatuses for supporting data connectivity with a roaming partner when a communication device is outside a home service provider's range of coverage. In one aspect, a user can select and store a roaming partner that is capable of data communication. While roaming, the communication device will display the data-roaming partners that are currently available within the communication range of the device and the user can choose one of these data-roaming partners and store the data-roaming partner information in memory. Upon re-entering the region within communication range of that data-roaming partner, the device will display the user's preference rather than the roaming partner ordinarily selected by the device.

In one embodiment, when the user travels outside his or her service provider's area of coverage, he or she is alerted to an available roaming partner, referred to as Roaming Partner A. The user may opt to select a different roaming partner by choosing to expand a list of all available data-roaming partners. In one embodiment, this may be accomplished by selecting a button on a user interface of the device. Other suitable arrangements for viewing and/or selecting the list of available data-roaming partners may be employed, as the present invention is not limited in this respect. Continuing with this example, the user may then be provided with a list of Roaming Partner A and Roaming Partner B. Upon selection of a button on the user interface, the user may choose Roaming Partner B and further may select Roaming Partner B as a user preference. In this manner, the next time the user is within range of Roaming Partner B, the user will automatically be alerted to Roaming Partner B on the device. In one embodiment, when the user travels outside the range of Roaming Partner B, and outside the range of his or her home Service Provider, the device will display a default roaming partner. The process of selecting a storing another roaming partner when in a location outside the range of Roaming Partner B and outside the range of his or her home Service Provider will be the same as that described above with respect to selecting and storing Roaming Partner B.

Aspects of the invention rely on the availability of the list of data-roaming partners for the service provider. In one embodiment, this list is available as a pair (PartnerId, PartnerName); where PartnerId is a globally unique identifier for each roaming partner, and PartnerName is a descriptive name of the data-roaming partner (e.g. Vodafone, Orange, T-Mobile, Hutch, Airtel, etc.).

Several techniques may be employed to provide the PartnerID and PatnerName of the data-roaming partner, as the present invention is not limited in this respect. Some exemplary techniques will now be briefly described.

In one embodiment, the information is provided by the Service Provider while installing the requisite software on the device. In one embodiment, the information may be sent by corporate information technology administrators to all machines in the company using group policy. In one embodiment, the information is provided by the device manufacturer. In one embodiment, the user may download the information from the Internet. Other suitable techniques for loading the information regarding the data-roaming partners on the device may be employed, as the present invention is not limited in this respect.

In one embodiment, while roaming, the device is queried to determine the roaming partner to which the device is registered (e.g. Vodafone). As described above, initially, this partner is displayed to the user. In this case, since the user does not have any preferences, Vodafone would be displayed in the user interface.

When the user so desires, e.g., upon launching a routine from the user interface, the device may be queried so that all available roaming partners can be displayed. In one embodiment, the device may display both the voice- and data-roaming partners in the ProviderId, ProviderName format. In one embodiment, the device may display only data-roaming partners in the ProviderId, ProviderName format.

In one embodiment, the user may store a preferred roaming partner as a user preference, and in one embodiment, this may be formatted as UserPreference-ProviderId, UserPreference-ProviderName, where UserPreference-ProviderId and User-Preference-ProviderName are the ProviderId and Provider-Name of the user preference. Thus, when the user returns the device to a region within the communication range of the roaming partner, the device will display the stored preferred roaming partner. For example, suppose a user travels from the US to the UK, upon instruction, the device will display all data-roaming partners within range and the user then selects and stores one partner, e.g., Orange, even though the device may have been preregistered with the Vodafone network. Upon return to the UK, the user interface of the device would display Orange because the user stored this roaming partner in the device as a user preference.

It should be appreciated that the device stores the ProviderID and ProviderName as opposed to just the ProviderName. As such, the user preference may, in some situations, not be displayed even when the same ProviderName is available to the device. For instance, suppose the user were to now travel to Germany. In this situation, the device may again return to the default roaming partner (Vodafone) because "Orange" in Germany has a different ProviderId than "Orange" in the UK.

In GSM/GPRS networks, a ProviderId is a 6 digit number that is a combination of MCC+MNC, where MCC is the mobile country code and MNC is the mobile network code. Like country codes in telephone networks, MCC is different for different countries. Thus, "Orange" in the UK and "Orange" in Germany have different ProviderId's. This ensures that when the user travels to a country where the same ProviderName is available (but not the same ProviderID), the user's prior preference is ignored and the device will display the network to which the device is registered.

Although aspects of the invention are directed for use with GSM/GPRS communication systems, it should be appreciated that the present invention is not limited in this regard, as other suitable communication protocols may be employed, including, for example, Wi Max.

Once the device is returned to within a communication range of the home service provider, in one embodiment, the device can automatically switch back to the home service provider.

The above-described system and method may be useful when a user wishes to connect his or her mobile computing and/or communication device to a network. Connectivity may be in the form of a wireless card built into the device or connected to the device via a communication port or some other coupling arrangement, as the present invention is not limited in this respect.

Aspects of the process for supporting data-roaming on a wireless communication device will now be discussed with reference to FIG. 1. At block 20, a roaming partner capable of data communication is selected from a plurality of roaming partners. The roaming partner may, in one embodiment, be specific to a certain country or region. The user may then, at block 22, store the selected data-roaming partner on or in, for example, a computer-readable storage medium in the device as a user preference. Now, upon return of the device to an area that is within communication range of that roaming partner (such as, e.g., upon return to the country of the roaming partner), the device will automatically select the user's preference as indicated at block 24. Alternatively or in addition, the device may display the user's preference to a user when the device returns to the country of the roaming partner, as indicated at block 26. The user can then manually select the user's preference, as indicated at block 24.

In one embodiment, in addition to selecting a roaming partner that is capable of data communication, a roaming partner that is also capable of voice communication may also be selected, as indicated at block 28.

In one embodiment, a list of one or more default roaming partners capable of data communication may be displayed to the user prior to the user selecting a roaming partner from the displayed list, as indicated at block 30.

In one embodiment, the selection may be based on cost. Other reasons for selecting a desired roaming partner exist, as the present invention is not limited in this respect. For example, the roaming partner may be based on communication speed, time availability, range of coverage, etc., as the present invention is not limited in this respect.

The aspects of the present invention described herein can be implemented on any of numerous computer/communication system configurations and are not limited to any particular type of configuration. In one embodiment, a computer-readable medium having computer-executable instructions may be provided whereby the computer-executable instructions is adapted to perform, when executed, at least portions of the process described herein.

In one embodiment, a wireless communication device capable of electronic wireless data communication via a roaming partner is provided. The device will now be described with reference to FIG. 2. The wireless device 50 includes a processor 52 and a computer-readable storage medium 54 cooperating with the processor. The storage medium 54 stores provider identification that identifies a roaming partner capable of data communication. In one embodiment, the provider identification has been previously selected and stored in the storage medium by a user as user preferences. A radio 56 cooperates with the processor 52 and allows the processor 52 to communicate with the roaming partner. A user interface 58 cooperates with the storage medium. The user interface 58 is adapted to allow the user to input various commands and allows the user to automatically or manually select the previously selected and stored provider identification. In one embodiment, the user interface can include a button or icon or other user-input arrangement to allow the user to select desired options or input desired instructions to the device. In one embodiment, the user interface 58 is adapted to allow the user to select the roaming partner based on cost, such as the low cost roaming partner. It should be appreciated that other suitable communication devices may be employed, as the present invention is not limited in this respect.

As described above with reference to FIG. 1, each roaming partner can correspond to a certain country. In such an embodiment, the user interface 58 automatically selects one of the roaming partners when the device 50 is in the corresponding country.

In one embodiment, the storage medium 54 may include provider identification that identifies a roaming partner capable of voice communication. In this manner, as described above, voice communication may also be enabled by the device 50. In another embodiment, the storage medium 54 includes provider identification that identifies a roaming partner capable of both data and voice communication.

As noted above, the user interface 58 can allow the user to manually select one of the previously stored user preferences when the device is within a communication range of the roaming partner. Alternatively, the user interface 58 may be adapted for automatic selection of a previously stored user preference when the device 50 is within a communication range of the roaming partner.

Figure 2:
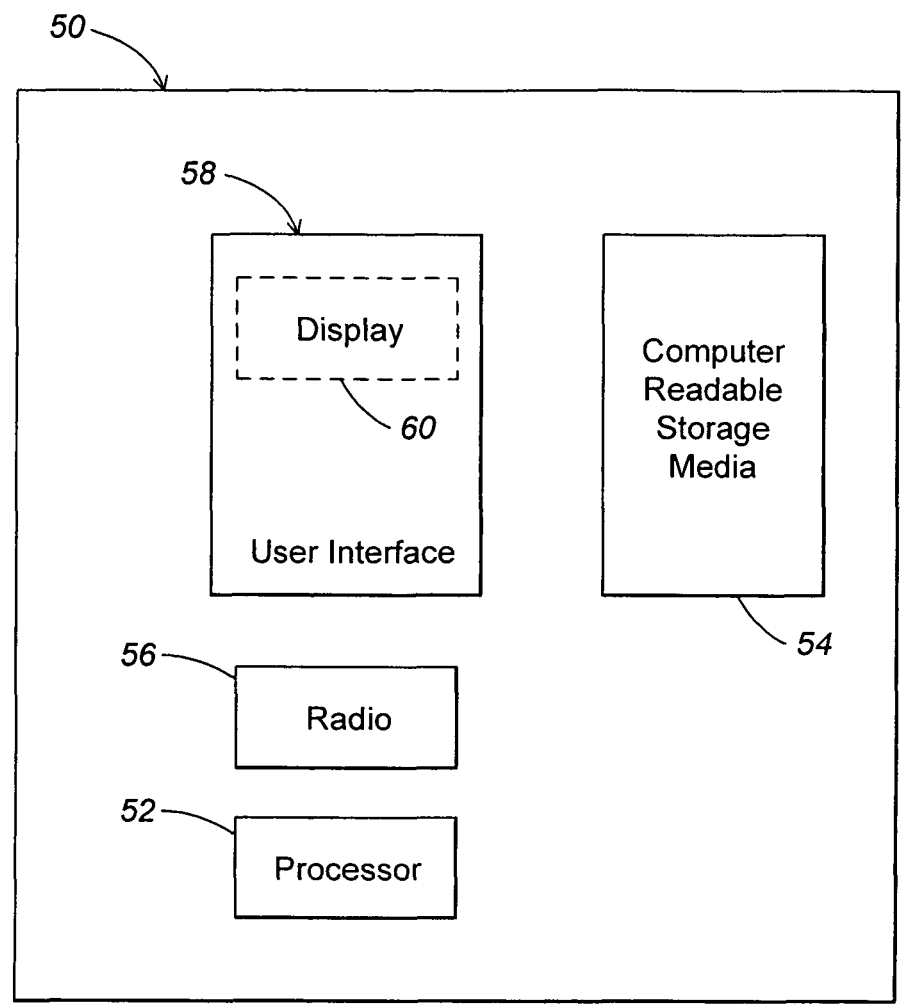
FIG. 2 is an exemplary wireless communication device that may be used in accordance with embodiments of the invention.

The device may further include a display 60. In one embodiment, the display may be formed with the user interface, as shown in FIG. 2, or may be a separate component. In one embodiment, the user interface display 60 is adapted to display all of the previously stored user preferences when the device is within a communication range of the roaming partner. In one embodiment, the user interface display 60 is adapted to display a default list of roaming partners capable of data communication. The user interface 58 may then be used to allow the user to select a roaming partner from the displayed list.

As used herein, the term "display" means any device that can relay information to the user. As such, the display can either show information to the user via a suitable electronic screen or can provide an audible cue to the user. Other arrangements for alerting the user may be employed, as the present invention is not limited in this respect.

Figure 3:
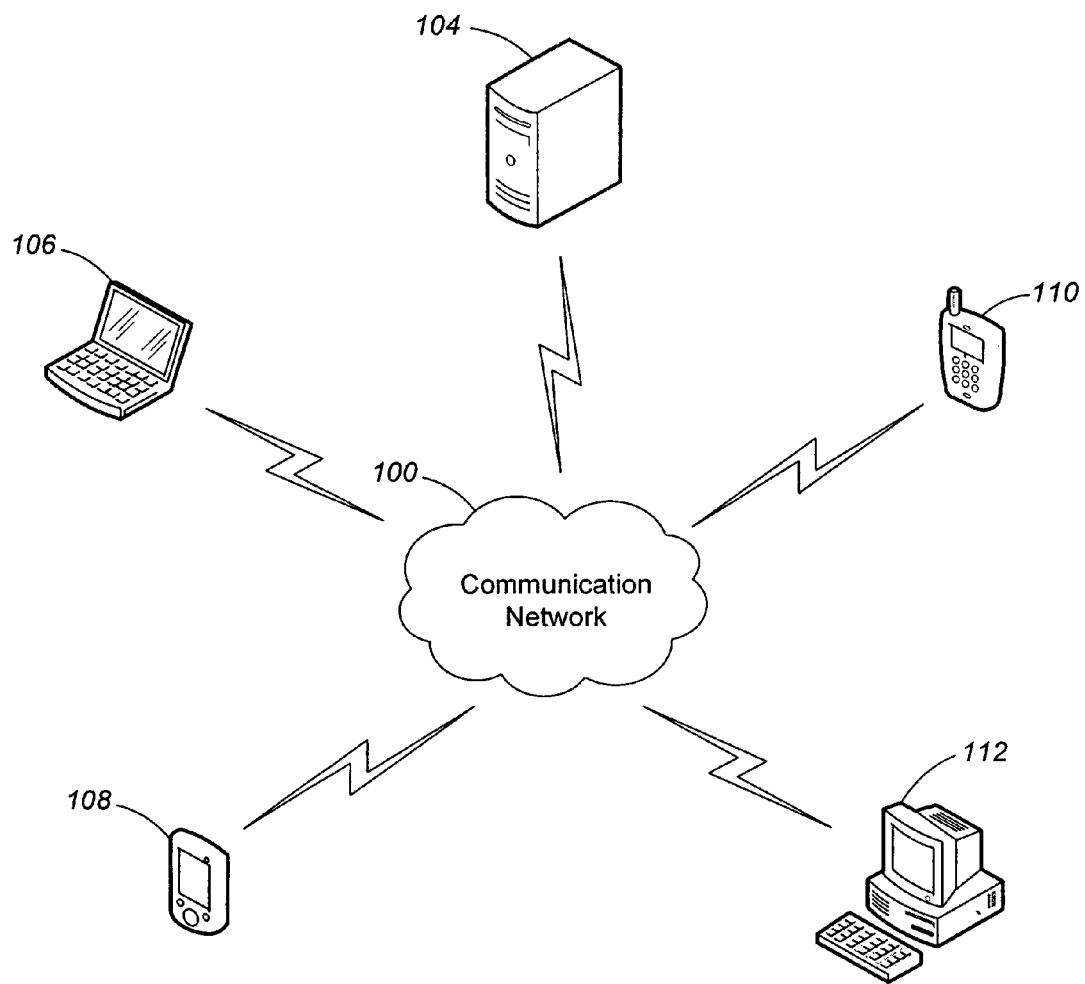
FIG. 3 is a diagram of an illustrative environment in which embodiments of the invention may be implemented.

FIG. 3 illustrates an example of a communication system on which aspects of the invention can be implemented, although others are possible. The system of FIG. 3 includes communication network (e.g., service provider) 100 and wireless communication devices 104-112. Communication network 100 can be any suitable communication medium or media for exchanging data between two or more communication devices. The wireless devices can be any suitable communication and/or computing device with wireless communication capabilities and may include the components described above with reference to FIG. 2 (and/or the components that will be described with reference to FIG. 4). Several exemplary wireless communication/computing devices are shown, including laptop 106, personal digital assistant 108, and smart phone 110. Each of these devices is in a state of, or capable of being in a state of, wireless communication with communication network 100. This wireless communication allows the communication devices to exchange data through communication network 100.

Figure 4:
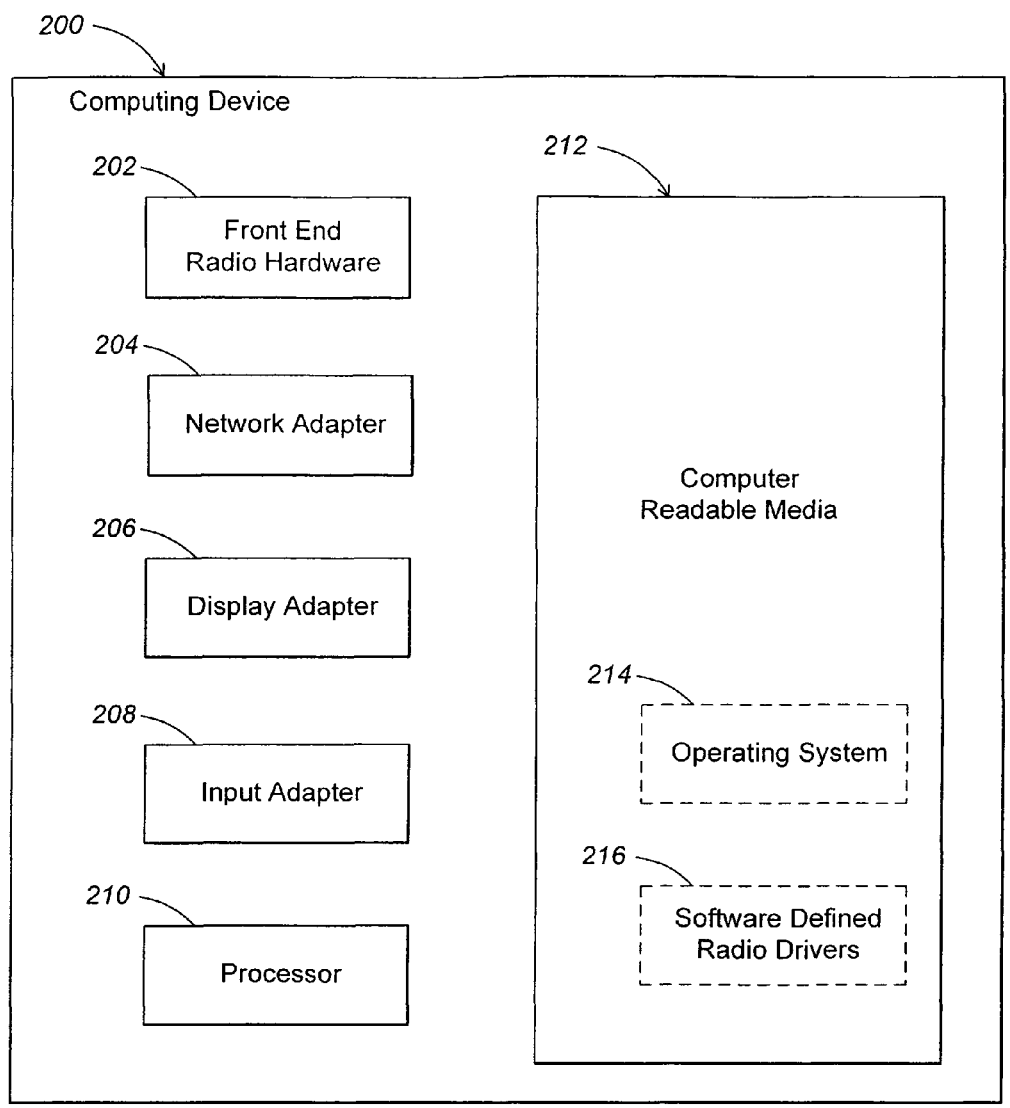
FIG. 4 is another exemplary wireless communication device that may be used in accordance with embodiments of the invention.

FIG. 4 schematically shows another illustrative communication/computing device 200 that may be used in accordance with one or more embodiments of the invention. FIG. 4 is intended to be neither a depiction of necessary components for a communication device to operate with embodiments of the invention nor a comprehensive depiction. Device 200 may comprise front end radio hardware 202 to communicate wirelessly, e.g., with communication network 100. Device 200 may also comprise a network adapter 204 to communicate over a computer network using other (possibly non-wireless) methods, a display 206 adapted to display information to a user of the device, and an input arrangement 208 adapted to receive commands from the user. Device 200 may further comprise computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the device 200. The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front-end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front-end 202 may be implemented to perform a minimum of the required functions that need to be performed at the hardware level, with the remaining functions being implemented by SDR drivers 216. The present function is not limited to use with systems that decide the responsibilities of the hardware and software in any particular way. Front-end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front-end 202 to customize the hardware of the front-end 202 according to a particular wireless protocol.

It should be appreciated that one embodiment of the invention is directed to use with a communication/computing device having programmable circuitry (e.g., the front end hardware 202 and the SDR drivers 216) that is programmable by control instructions to generate and/or receive signals according to a wireless protocol. Again, this programmable circuitry can take any suitable form and include any collection of directly programmable circuitry (e.g., a programmable processor) and circuitry that interacts with directly programmable circuitry to enable communication according to a wireless protocol.

It should also be appreciated that the embodiments of the present invention described herein are not limited to being practiced with the type of device illustrated in FIG. 4, and that embodiments of the invention can be practiced with any suitable communication/computing device. The front-end 202 and components 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a communication device may be embodied in any of a number of forms, such as a rack-mounted computer, a desktop computer, a laptop computer, or a tablet computer. Additionally, a communication device may be embedded in a device not generally regarded as a computer but with suitable processing capabilities, including a Personal Digital Assistant (PDA), a smart phone or any other suitable portable or fixed electronic device.

Also, the communication device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a communication device may receive input information through speech recognition or in other audible format.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more communication devices, computers, or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a communication device, computer or other processor to implement various aspects of the present invention as discussed above. Additionally, it should be appreciated that according to one aspect of this embodiment, one or more computer programs that when executed perform methods of the present invention need not reside on a single communication device, computer or processor, but may be distributed in a modular fashion amongst a number of different communication devices, computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of supporting data-roaming on a wireless communication device, the wireless communication device comprising a mobile cellular device that can perform voice and data communication over cellular telephony networks, the method comprising:

making determinations that the communication device is roaming, and each time one of the roaming determinations is made in a given region:

checking for the presence of preferred-partner information on the communication device and determining therefrom whether there is a preferred roaming partner for the given region;

if determined from the checking that there is not a preferred roaming partner for the region, automatically selecting, to serve as a target partner, a default roaming partner determined to be associated with the mobile device;

if determined from the checking that there is a preferred roaming partner for the region, automatically selecting, to serve as the target partner, the preferred roaming partner;

providing a user interface element, wherein the user interface element, if activated by a user of the communication device, will display names of one or more other partners determined by the mobile device to be within range of the mobile device, the preferred roaming partner and the other partners comprising respective telecommunications firms that operate cellular telephony networks, respectively;

if the user interface element is activated, responsive to the user selecting a corresponding one of the one or more other partners, using the selected partner to serve as the target roaming partner and storing an indication of the selected partner in the communication device as the preferred-partner information; and selecting, as a current cellular telephone network to be used by the communication device, whichever of the cellular telephone networks are operated by the partner selected as the target partner.

2. The method of claim 1, wherein the target partner is capable of providing cellular voice communication.

3. The method of claim 1, wherein the target partner is automatically selected based on cost.

4. The method of claim 1, wherein when the preferred-partner information is determined to be present, automatically using the corresponding preferred partner as a roaming partner when the device is within a communication range of the preferred partner.

5. The method of claim 1, in further response to a determination of roaming in the given region, displaying a name of the target partner prior to any display of the user interface element, such that selection of the name of the target partner causes the target partner to be used for while roaming in the given region.

6. The method of claim 1, further comprising displaying a default list of roaming partners capable of data communication and thereafter selecting the target partner from the displayed list.

7. The method of claim 1, further comprising automatically switching back to a home service provider when the device determines that it is within a communication range of the home service provider.

8. A wireless communication device capable of electronic wireless data communication via a roaming partner, the device comprising:

a processor;

a storage cooperating with the processor, the storage including provider identifications that identify cellular roaming partners capable of cellular data communication and cellular roaming partners capable of cellular voice communication, the provider identifications having been previously stored in the storage by a user;

a radio cooperating with the processor for allowing the processor to communicate with the cellular roaming partners, the radio detecting which of the partners are within range of the communication device;

a user interface that is displayed on the device responsive to respective determinations of roaming by the processor;

wherein the processor, for each of the roaming determinations:

checks for the presence of preferred-partner information on the communication device to determine if there is a preferred partner for the given region, if the check indicates that there is not a preferred partner for the region, automatically selects, to serve as a target partner, a default partner determined to be associated with the communication device, if the check indicates that there is a preferred partner for the region, automatically selects, to serve as the target partner, the preferred partner, causes the user interface to display a name of the target partner such that if the name is selected the corresponding target partner is used during the roaming, provides the user interface with a user interface element that is displayed if activated by a user of the communication device, the user interface element, if displayed, displaying names of the partners determined by the mobile device to be within range of the communication device, wherein if the processor determines that one of the names in the list has been selected by the user: the corresponding partner is selected to serve as the target partner, and an indicator of the corresponding partner is stored as the preferred-partner information, and uses the target partner as a roaming partner for cellular data or cellular voice communication during the corresponding roaming.

9. The device of claim 8, wherein the storage medium includes provider identification for each of a plurality of roaming partners, each roaming partner corresponding to a certain country, wherein the user interface automatically selects one of the roaming partners when the device is in the corresponding country.

10. The device of claim 8, wherein the storage medium includes provider identification that identifies a roaming partner capable of voice communication.

11. The device of claim 8, wherein the storage medium includes provider identification that identifies a roaming partner capable of both data and voice communication.

12. The device of claim 8, wherein the user interface is adapted to automatically select the target partner based on cost.

13. The device of claim 8, wherein the user interface is further adapted to display names of respective previously selected partners.

14. The device of claim 8, wherein the user interface is further adapted to display a default list of roaming partners capable of data communication and wherein the user interface is adapted to allow the user to select the target partner from the displayed list.

15. A method performed by a mobile device for cellular communication, the method comprising:
- each time the mobile device determines that it is out of range of a home cellular provider of the mobile device:
  - determining which one or more of cellular data-roaming providers and cellular voice-roaming providers are in range of the mobile device;
  - checking for the presence of preferred-partner information on the mobile device to determine if there is a preferred roaming partner for the mobile device;
  - if the checking indicates that there is not a preferred roaming partner for the region, automatically selecting, to serve as a target partner, a default partner determined to be associated with the mobile device;
  - if the checking indicates that there is a preferred roaming partner for the region, automatically selecting, to serve as the target partner, the preferred partner;
  - providing a user interface element that if activated by a user of the mobile device will cause the mobile device to display a list indicating the one or more of cellular data-roaming and cellular voice-roaming providers determined to be in range of the mobile device;
  - if the user interface element has been displayed, and if determined that one of the providers indicated in the displayed list has been selected by the user, using the selected provider to serve as the target provider and storing an indication of the selected provider as the preferred-partner information; and
  - responding to user input selecting a displayed indication of the target partner by using the target partner as a roaming partner for the mobile device.

* * * * *